July 17, 1934.  J. H. WALKER  1,967,166
SELF LOADING AND UNLOADING TRUCK
Filed Dec. 27, 1932   2 Sheets-Sheet 2
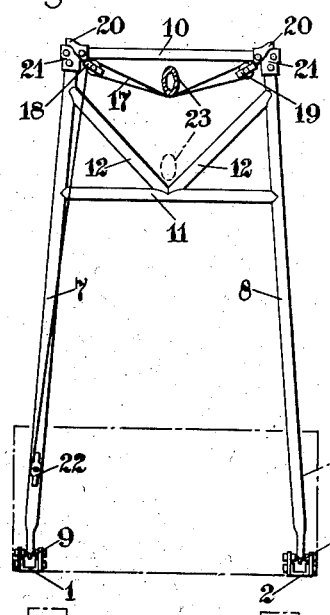
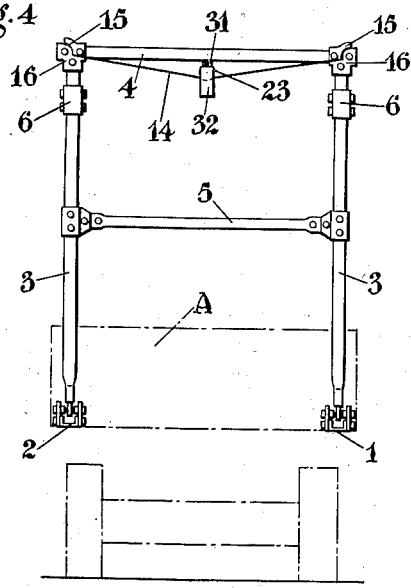
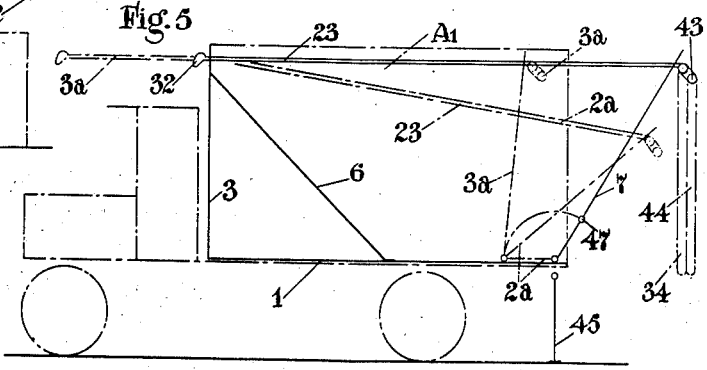
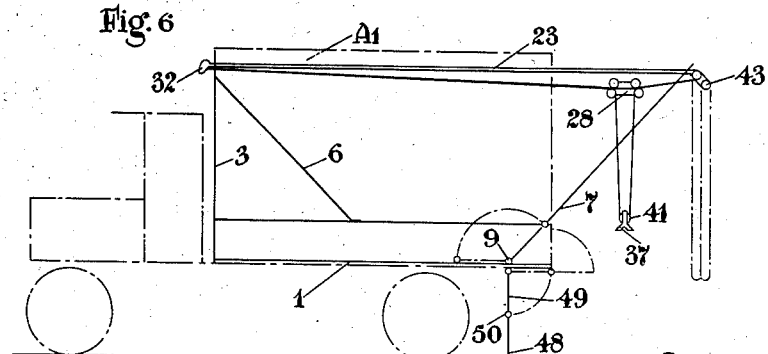
Inventor
Joab Haigh Walker Patented July 17, 1934

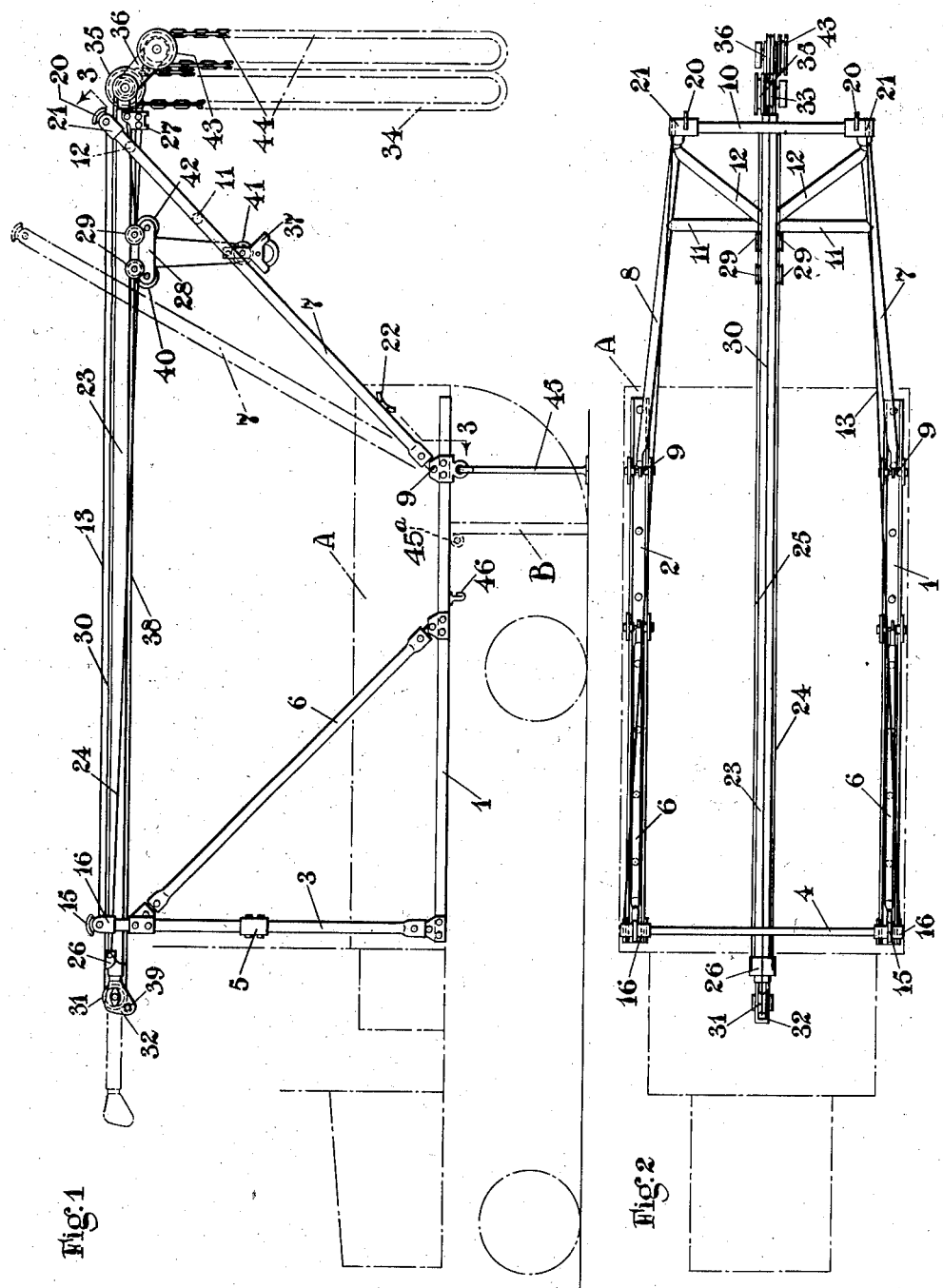

1,967,166

UNITED STATES PATENT OFFICE 1,967,166

SELF LOADING AND UNLOADING TRUCK

Joah Haigh Walker, Blackheath, London, England

Application December 27, 1932, Serial No. 649,089
In Great Britain February 22, 1932

9 Claims. (Cl. 212—74)

This invention relates to a self loading and unloading truck and has for its principal object to provide a novel lifting and hauling gear for a truck or like vehicle, more especially an automotive vehicle, in which the lifting and hauling gear is constituted by a self-contained unitary structure of extremely light construction in comparison with its weight and which is arranged to be carried upon a supporting frame.

A further object of the invention is to provide means whereby the rear end of the lifting and hauling gear may be arranged to extend beyond the end of the vehicle when in use and retracted within the confines of the vehicle body when out of use.

Further features of the invention are described below and defined in the appended claims.

In order that the invention may be fully understood, reference is directed to the accompanying drawings, in which:—

Figure 1 illustrates in side elevation a lifting and hauling gear constructed in accordance with the invention and showing diagrammatically the gear applied to a motor lorry;

Figure 2 is a plan of Figure 1;

Figure 3 is a sectional rear view of the gear illustrated in Figures 1 and 2 looking in the direction of the arrows 3—3 of Figure 1;

Figure 4 is a front view of the gear illustrated in Figures 1 and 2, and

Figures 5 and 6 are diagrammatic views similar to Figure 1 but illustrating, respectively, modified forms of the invention.

Referring to Figures 1 to 4, a lifting and hauling gear is illustrated as applied to a motor lorry for loading and unloading purposes, the body of the lorry being indicated diagrammatically at A.

The lifting and hauling gear comprises a pair of horizontal channel section girders 1, 2 secured to the floor of the lorry at the sides thereof, for example, by means of bolts, not shown. At the forward end of the girders a vertical tubular frame is mounted comprising uprights 3 and upper and lower cross members 4, 5 and the said frame is braced to the girders 1 and 2 by struts 6. Towards the rear end of the vehicle, a pair of tubular shear legs 7, 8 are pivotally mounted at 9 to the girders 1, 2 and are connected together at their upper ends by a cross tube 10, whilst a lower cross tube 11 and tubular struts 12 are provided as additional bracing means between the said legs. The upper ends of the shear legs 7, 8 are connected to the upper ends of the uprights 3 by tie wires or ropes 13, so that the normal position of the shear legs when the gear is in use, is that indicated in full lines in Figure 1. A fixed transverse cableway 14 is suspended below the cross frame members 4, being secured behind lugs 15 provided upon socket-joints 16 which effect a junction between the member 4 and the uprights 3. A further transverse cableway 17 is suspended below the cross tube 10 and is carried at its ends by pulleys 18, 19 secured to lugs 20 provided upon upper sockets 21 of the shear legs 7, 8. The cableway 17 is adjustable as to its degree of sag and a cleat 22 is provided on the leg 7 to enable the cable to be secured in any position to which it is adjusted.

A tubular boom cableway of which the boom 23 is supported at its ends upon the transverse cableways 14 and 17 is provided with two suspension cables 24, 25 disposed upon either side of the boom and secured to the ends thereof by anchorage brackets 26, 27. A travelling carriage 28 is carried by the cables 24, 25 through the medium of pulley wheels 29 so that the carriage can be traversed from one end of the boom to the other. The traversing movements of the carriage are effected by means of a continuous cable 30 secured to the carriage 28 and extending around a pulley 31 rotatably mounted in a sheaf 32 carried at the front end of the boom 23 and around a pulley 33 mounted at the rear end of the boom. The pulley 33 is operable to be rotated in either direction by means of a hand operated chain and pulley mechanism 34, 35 operatively connected to the said pulley 32 and mounted in a sheaf 36 carried by the boom.

The carriage 28 is provided with a lifting and lowering tackle 37, the operative cable 38 of which is anchored at 39 to the sheaf 32 at the forward end of the boom 23, and extends successively over a pulley 40 on the carriage 28, a pulley 41 on the tackle 37 and a second pulley 42 on the carriage 28 and thence to a winding pulley 43 rotatably mounted on the rear end of the boom 23. The winding pulley 43 is operable manually through the medium of a chain and pulley mechanism 44.

The suspension cables 24, 25 are disposed above the transverse cableways 14 and 17 whilst the lower portion of the traversing cable 30 and the hauling cable 38 are located below the same.

With a lifting and hauling gear constructed as described, and the shear legs 7 and 8 disposed in the positions illustrated in Figures 1 and 2 in which they overhang the rear end of the lorry A, the lorry may be readily loaded by lifting the goods forming the load from the ground at the rear of the lorry by means of the tackle 37 operated by the chain mechanism 44 and then traversed along the suspension cables 24, 25 by the chain mechanism 34 to the correct position longitudinally of the lorry whilst the goods may be lowered into the correct position transversely of the lorry by moving the boom 23 transversely of the lorry along either or both the transverse cableways 14, 17. The arrangement of the operating chain mechanisms 34, 44 at the rear end of the boom enables the lifting tackle and carriage 28 to be manipulated from the ground by one operator, whilst the gear itself provides no obstacle to the movement of the goods longitudinally and transversely over the floor of the lorry during the loading or unloading operations.

When the gear is not in use, for example, when the lorry is transporting the goods, the shear legs 7, 8 may be swung upwardly about their pivots 9 into the position illustrated in dot and dash lines in Figure 1. This movement of the shear legs may be accomplished in any desired manner and any convenient means may be employed for maintaining them in the raised position; for example, the cables 13 may be provided intermediate of their ends with eyes which can be hooked over projections such as the lugs on the forward frame of the gear. Alternatively, the carriage 40 may be moved towards the forward end of the boom and the tackle 37 secured to either of the transverse members 4 or 5, whereupon a manipulation of the chain 44 to raise the tackle 37 results in the drawing of the boom 23 forwardly and the raising of the shear legs 7 and 8; the forward movement of the boom 23 may be limited by a stop on the boom abutting against the transverse cableway 14. In the raised position of the shear legs it is desirable that the transverse cableway 17 should be lowered so that the rear end of the boom 23 is located in the position indicated in dotted lines in Figure 3, particularly when, as may readily be arranged, the frame of the gear is employed as a support for an awning for the lorry.

If the overhang of the gear rearwardly of the lorry is sufficient to necessitate the provision of some means for preventing the lorry tipping downwards at the rear thereof, when relatively heavy loads are lifted, a pair of props, such as that indicated at 45 in Figure 1, may be provided and which are normally maintained in a raised position by means of hooks 46, but which may be lowered into the position indicated in Figure 1 to support the gear at the lower ends of the shear legs 7, 8.

In certain circumstances, it may be desirable to construct the rear portion of the floor of the lorry in the form of a flap which is hingedly connected to the vehicle body as indicated at 45a, Figure 1, so as to be movable downwardly into the position indicated at B, Figure 1, and thus enable goods to be lifted from or lowered on to the ground through the space so provided. This feature is of particular utility when it is undesirable that the rear end of the boom should extend beyond the rear of the lorry to the extent shown in Figure 1. In this construction the props 45 may be secured to or constituted by the flap B.

Referring to Figure 5, a modification of the arrangement illustrated in Figures 1 to 4 is illustrated diagrammatically, which is particularly intended for use with delivery vans provided with an enclosed body and rear doors which require to be closed when the vehicle is travelling. In this arrangement, the shear legs 7 and 8 are each formed of two articulated portions, the hinged joint between which is indicated at 47, this joint being of well-known elbow construction which permits the upper portion to be moved relatively to the lower portion in a clockwise direction in Figure 5, but prevents movement thereof in an anti-clockwise direction from the position shown.

A spring may be operatively connected to the two portions of each shear leg in the vicinity of the joint 47 in such a manner that it tends to maintain the said portions in the extended position illustrated in full lines in Figure 5.

To move the boom 23 and the shear legs within the confines of the van body the joints 47 are first broken so that the portions of the shear legs are moved forwardly and the boom dropped into the position indicated at 2a. The upper portions of the shear legs are then moved within the body of the van shown diagrammatically at A1 as also the rear end of the boom 23 the forward end of which then projects through the front of the body of the van; the final position of the upper portion of the shear legs and the boom are indicated at 3a in Figure 5, and in this position of the gear the rear doors of the van may readily be closed, whilst the various members of the gear do not constitute obstructions in the interior of the van.

Referring to the modified construction illustrated diagrammatically in Figure 6, an arrangement is shown which is similar to that of Figure 5 with the exception that the tailboard 48 and a rear portion of the floorboard 49 of the van are hinged together and to the floor of the vehicle at 50 and are arranged to be swung downwardly into the positions indicated in full lines.

The above described constructions are susceptible to numerous modifications within the scope of the invention. For example, the frame members 3 and 6 and the shear legs 7, 8 may be mounted at their lower ends upon members of the chassis of the vehicle or upon transverse girders mounted thereon, in lieu of the girders 1 and 2. Also the lower end of each strut 6 and the shear legs 7 or 8 on the same side of the gear may be connected to one another and mounted together upon the vehicle, for example, upon a transverse girder. If desired, the framing at the back of the cab of a lorry or other vehicle may be utilized instead of the vertical frame at the forward end of the gear, the struts 6 being preferably retained. Instead of the tie wires 13, rigid frame members may be provided and the side frames thus formed may be strengthened by any desired struts or other members.

In lieu of the transverse cableways 14 and 17, rigid tranverse supporting members may be employed and if it is desired to effect vertical adjustment of the position of either or both ends of the boom cableway, a plurality of such transverse supporting members arranged one above the other may be provided so that the respective end of the boom may be supported upon any one thereof.

The reduction in height of the shear legs 7 and 8 to accommodate them within the body of the vehicle, or for other reasons may be effected by constructing the shear legs, for example, of two telescoping sections arranged to be extended or collapsed relatively to one another as required and the extension thereof may be effected by a fluid pressure operated mechanism such as a hydraulic piston and cylinder mechanism.

The actuation of the pulleys for operating the traversing and lifting cables of the boom cableway may, if desired, be effected by means of an electric driving motor and suitable gear mechanism mounted upon the rear end of the boom, but generally it would be sufficient to limit the employment of such power drive to the operation of the lifting cable of the gear; a brake device may be provided operable to permit the lowering of the load to be effected, under control, due to its own weight.

In a further modified form of gear constructed in accordance with the invention, one end of the boom cableway is supported, when in use, upon the upper end of a strut or frame, the lower end of which rests upon the ground at the requisite distance from the end or side of the vehicle whilst the other end of the boom is mounted upon a support provided upon the vehicle in such a manner as to be displaceable in a lateral direction and thus enable goods forming a load for the vehicle to be lowered into place at any desired point upon the floor of the vehicle.

Lifting and hauling gear constructed as above described, may be incorporated with a vehicle having a tipping body in such a manner that the lifting tackle may be attached to the end of the body arranged to be raised and the tackle operated to tip the body and empty the load in the usual manner. This arrangement avoids the inherent disadvantages which are present in a tipping body which is pushed upwards by a screw or hydraulic ram, because the operative parts are subjected to tensional instead of compressional forces.

In all cases where the frame structure of the gear permits, it may be employed as a supporting frame for an awning or cover for the vehicle.

The gear frame and boom may be constructed from a variety of materials, but is particularly suited to the employment of light metal alloys, and a tubular framework is especially suitable so as to provide a gear of light weight, thus avoiding an undesirable addition to the tare weight of the vehicle.

What I claim and desire to secure by Letters Patent of the United States is:—

1. A lifting and hauling gear for loading and unloading vehicles which comprises in combination a supporting framework adapted to be mounted upon a vehicle and which includes a pair of shear legs pivotally connected at their lower ends to said framework and arranged to be located at the rear of the vehicle so as normally to extend upwardly and beyond the rear end of the vehicle, means operable to move said shear legs into and retain them in a substantially vertical position, at least a pair of horizontal supporting members disposed transversely of the framework, one carried at the front of the framework and another carried at the upper ends of said shear legs so as to be adjustable as to height, a boom cableway supported at its ends upon said horizontal supporting members so as to be displaceable laterally thereon and a lifting tackle carried by a carriage supported upon and movable along the boom cableway.

2. A lifting and hauling gear for loading and unloading vehicles which comprises in combination a supporting framework adapted to be mounted upon a vehicle and which includes a pair of shear legs pivotally connected at their lower ends to said framework and arranged to be located at the rear of the vehicle so as normally to extend upwardly and beyond the rear end of the vehicle, means operable to move said shear legs into and retain them in a substantially vertical position, at least a pair of horizontal supporting members disposed transversely of the framework, one carried at the front of the framework and another carried at the upper ends of said shear legs so as to be adjustable as to height, a boom cableway supported at its ends upon said horizontal supporting members so as to be displaceable laterally thereon, a lifting tackle carried by a carriage supported upon and movable along the boom cableway and mechanism mounted at the rear end of the boom cableway and operable to traverse the carriage along the cableway and actuate the lifting tackle in any position of said carriage.

3. A lifting and hauling gear for loading and unloading vehicles which comprises in combination a supporting framework mounted upon a vehicle, and provided with at least a pair of substantially horizontal supporting members disposed transversely of the vehicle at opposite ends thereof and at least one of which is constituted by a cable adjustable as to degree of sag, a boom cableway supported at its ends respectively upon the said transverse members so as to be displaceable laterally thereon, and a lifting tackle carried by a carriage supported upon and movable along the boom cableway.

4. A lifting and hauling gear for loading and unloading vehicles which comprises in combination a supporting framework mounted upon a vehicle, and provided with at least a pair of substantially horizontal supporting members disposed transversely of the vehicle at opposite ends thereof, and at least one of which is constituted by a cable adjustable as to degree of sag, a boom cableway supported at its ends respectively upon the said transverse members so as to be displaceable laterally thereon and adapted to extend beyond the rear end of the vehicle, a lifting tackle carried by a carriage supported upon and movable along the boom cableway and chain and pulley mechanism located at the rear end of the boom cableway and operable to traverse the carriage along the cableway and actuate the lifting tackle in any position of said carriage.

5. A lifting and hauling gear for loading and unloading vehicles which comprises in combination a supporting framework adapted to be mounted upon a vehicle and which includes a pair of shear legs adjustable in effective length and pivotally connected at their lower ends to said framework, said shear legs being arranged to be located at the rear of the vehicle so as normally to extend upwardly and beyond the rear end of the vehicle, means operable to move said shear legs into and retain them in a substantially vertical position, at least a pair of horizontal supporting members disposed transversely of the framework, one carried at the front of the framework and another carried at the upper ends of said shear legs so as to be adjustable as to height, a boom cableway supported at its ends upon said horizontal supporting members so as to be displaceable laterally thereon and a lifting tackle carried by a carriage supported upon and movable along the boom cableway.

6. A lifting and hauling gear for loading and unloading vehicles which comprises in combination a supporting framework adapted to be mounted upon a vehicle and which includes a pair of shear legs adjustable in effective length and pivotally connected at their lower ends to said framework, said shear legs being arranged to be located at the rear of the vehicle so as normally to extend upwardly and beyond the rear end of the vehicle, means operable to move said shear legs into and retain them in a substantially vertical position, at least a pair of horizontal supporting members disposed transversely of the framework, one carried at the front of the framework and another carried at the upper ends of said shear legs so as to be adjustable as to height, a boom cableway supported at its ends upon said horizontal supporting members so as to be displaceable laterally thereon, a lifting tackle carried by a carriage supported upon and movable along the boom cableway and mechanism mounted at the rear end of the boom cableway and operable to traverse the carriage along the cableway and actuate the lifting tackle in any position of said carriage.

7. A lifting and hauling gear for loading and unloading vehicles which comprises in combination a supporting framework adapted to be mounted upon a vehicle and which includes a pair of shear legs pivotally mounted at their lower ends to said framework and each leg of which is formed of at least two articulated portions operable to be folded within the confines of the vehicle and normally arranged when unfolded to extend upwardly beyond the rear end of the vehicle, at least a pair of horizontal supporting members disposed transversely of the framework, one carried at the front of the framework and another carried at the upper ends of said shear legs, a boom cableway supported at its ends upon said horizontal supporting members so as to be displaceable laterally thereon and a lifting tackle carried by a carriage supported upon and movable along the boom cableway.

8. A lifting and hauling gear for loading and unloading vehicles which comprises in combination a supporting framework adapted to be mounted upon a vehicle and which includes a pair of shear legs pivotally mounted at their lower ends to said framework and each leg of which is formed of at least two articulated portions operable to be folded within the confines of the vehicle and normally arranged when unfolded to extend upwardly beyond the rear end of the vehicle, at least a pair of horizontal supporting members disposed transversely of the framework, one carried at the front of the framework and another carried at the upper ends of said shear legs so as to be adjustable as to height, a boom cableway supported at its ends upon said horizontal supporting members so as to be displaceable laterally thereon and a lifting tackle carried by a carriage supported upon and movable along the boom cableway.

9. A lifting and hauling gear for loading and unloading vehicles which comprises in combination a supporting framework adapted to be mounted upon a vehicle and which includes a pair of shear legs pivotally mounted at their lower ends to said framework and each leg of which is formed of at least two articulated portions operable to be folded within the confines of the vehicle and normally arranged when unfolded to extend upwardly beyond the rear end of the vehicle, at least a pair of horizontal supporting members disposed transversely of the framework, one carried at the front of the framework and another carried at the upper ends of said shear legs, a boom cableway supported at its ends upon said horizontal supporting members so as to be displaceable laterally thereon, a lifting tackle carried by a carriage supported upon and movable along the boom cableway and mechanism mounted at the rear end of the boom cableway and operable to traverse the carriage along the cableway and actuate the lifting tackle in any position of said carriage.

JOAH HAIGH WALKER.